United States Patent [19]

Sansone et al.

[11] Patent Number: 5,431,515
[45] Date of Patent: Jul. 11, 1995

[54] DUAL BLADDER AIRBAG

[75] Inventors: Anthony J. Sansone; Douglas A. Goshorn, both of Franklin, Tenn.

[73] Assignee: Illinois Tool Works Inc., Glenview, Ill.

[21] Appl. No.: 158,282

[22] Filed: Nov. 29, 1993

[51] Int. Cl.⁶ .............................................. B60P 7/14
[52] U.S. Cl. .................................. 410/119; 410/125; 206/522
[58] Field of Search ............... 410/117, 118, 119, 121, 410/122, 123, 124, 125; 206/522; 383/25

[56] References Cited

U.S. PATENT DOCUMENTS

| | | | |
|---|---|---|---|
| 2,697,229 | 12/1954 | Krueger | 206/522 X |
| 3,554,135 | 1/1971 | Duvall et al. | 410/119 |
| 3,929,227 | 12/1975 | Burdis | 206/522 X |
| 3,955,690 | 5/1976 | Baxter | 410/118 |
| 3,960,281 | 6/1976 | Reeves | 410/119 |
| 4,136,788 | 1/1979 | Robbins | 414/119 |
| 4,184,596 | 1/1980 | Avery | 206/522 |
| 4,465,188 | 8/1984 | Soroka et al. | 206/552 |
| 4,553,887 | 11/1985 | Reeves | 410/119 |
| 4,572,716 | 2/1986 | West | 410/119 X |
| 4,591,519 | 5/1986 | Liebel | 410/119 X |
| 5,042,663 | 8/1991 | Heinrich | 410/119 |
| 5,263,801 | 11/1993 | Keenan et al. | 414/119 |

FOREIGN PATENT DOCUMENTS

| | | | |
|---|---|---|---|
| 2291114 | 6/1976 | France | 206/522 |
| 1052586 | 12/1966 | United Kingdom | 410/119 |

*Primary Examiner*—David A. Bucci
*Assistant Examiner*—James Eller
*Attorney, Agent, or Firm*—Schwartz & Weinrieb

[57] ABSTRACT

A cargo airbag structure system for use within a cargo bay of a transport vehicle in order to buffer and stabilize loads, such as, for example, large paper rolls or drums, comprises two inflatable bladders disposed in an overlapping disposition with respect to each other within a sealed, expandible, multi-ply paper container. When interposed between the cargo load rolls, the airbag structure conforms to the external contours of the cargo load rolls which serves to not only enable the airbag system to buffer and stabilize the cargo loads, but in addition, the airbag system is stably retained between the cargo load rolls. In order to prevent friction, abrasion, or pinching of the bladders during the inflation process as well as during use of the airbag system when the bladders are disposed in their inflated state, the inflatable bladders are disposed within encasing sleeves which fully envelop the bladders along the longitudinal extents thereof, the opposite ends of the sleeves being open. By preventing the noted friction, abrasion, and pinching of the bladders, the structural integrity of the bladders is preserved resulting in enhanced service life.

22 Claims, 2 Drawing Sheets

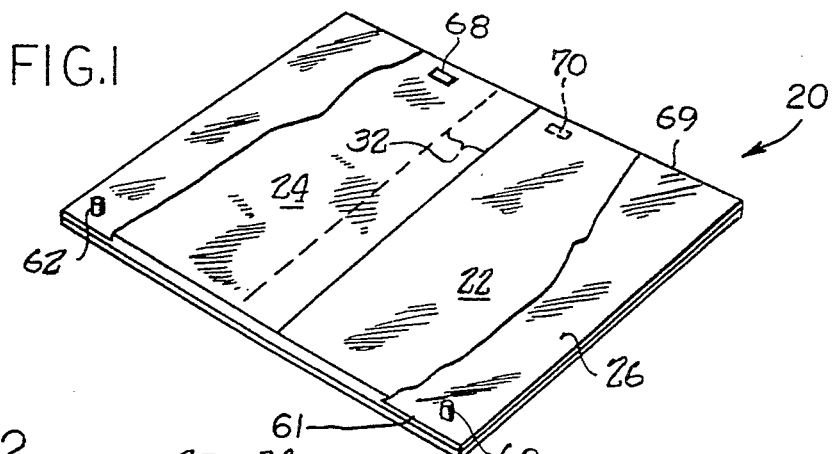
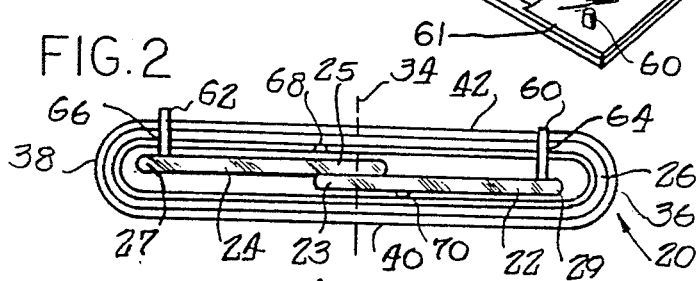
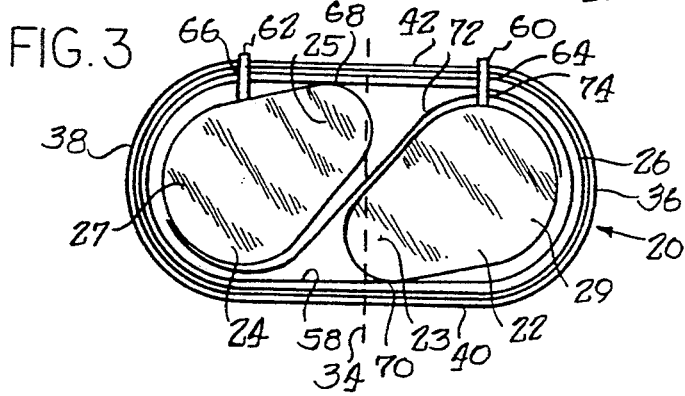
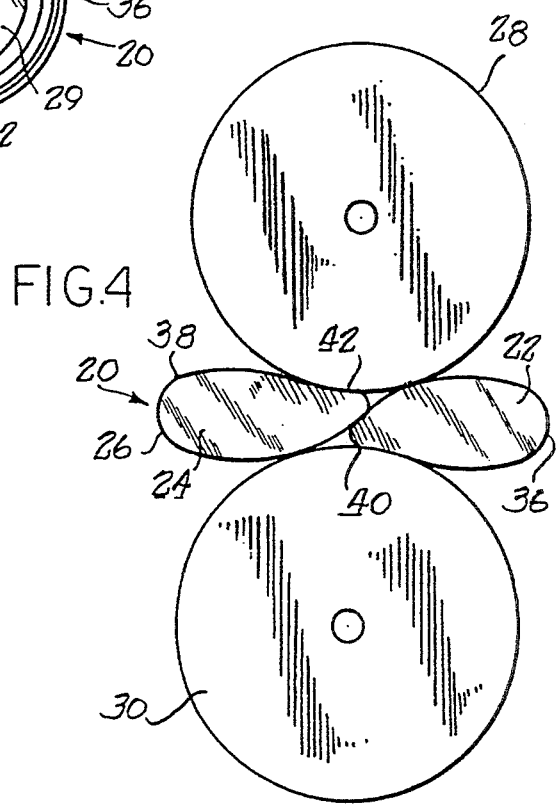
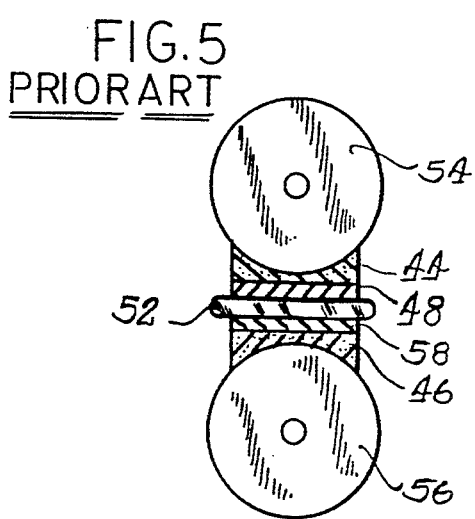

DUAL BLADDER AIRBAG

CROSS-REFERENCE TO RELATED PATENT APPLICATIONS

This patent application is related to U.S. patent application Ser. No. 983,045 filed Nov. 30, 1992, now U.S. Pat. No. 5,263,801, issued Nov. 23, 1993.

FIELD OF THE INVENTION

The present invention relates generally to airbag structures, and more particularly to cargo airbags which are interposed between loads, such as, for example, large paper rolls, drums, or the like, being shipped within a transport vehicle, such as, for example, a train, ship, truck, aircraft, or the like, in order to brace the loads against shifting such that the loads do not become damaged during any movement of the same within cargo spaces or voids normally being present between individual load structures, the cargo airbag structures of the present invention also serving to minimize the need for additional buffer or dunnage materials or structures as has been heretofore conventionally required.

BACKGROUND OF THE INVENTION

It is conventionally known in the cargo transportation art to use inflatable airbags in order to properly brace a transportable load, such as, for example, large paper rolls in order to prevent any shifting of the cargo loads during the transportation of the same so that the loads do not become damaged. Such conventional airbags usually consist of a single, inflatable, thermo-plastic bladder surrounded by or encased within some type of container, such as, for example, a multi-ply paper container. The container effectively prevents the inflatable bladder from being punctured by the load or other objects which may be located within the cargo bay. The inflatable airbag of course includes an air inlet valve so that the inflatable bladder may be readily inflated.

In order to properly brace a load using the aforenoted single type of airbag, specially contoured roll buffers or chocks, as shown in FIG. 5, are additionally required in order to positionally hold or retain the airbag between the load rolls or between a load roll and a wall of the cargo bay. As can be appreciated from FIG. 5, the specially contoured roll buffers or chocks have a particular configuration or shape which complements or conforms to the shape or configuration of the load rolls and are therefore able to positionally retain the airbag and load rolls essentially fixed with respect to each other. Still further, additional dunnage is often needed to be interposed between the buffers or chocks and the airbag in order to pad or serve as shock absorbers or friction dissipators at the point of contact defined between the airbag and the contoured load roll buffers or chocks. If the load roll buffers or chocks, as well as the additional dunnage, were not employed within the load or cargo system, the airbag would have a tendency to positionally move with respect to, and even become disengaged from its position between, the load rolls.

When the single type of conventional bladder airbag is employed in connection with the bracing of loads during transportation of the same, the airbag is initially interposed between the specially contoured roll buffers and additional dunnage, in a deflated condition, and is subsequently inflated through means of its air inlet valve with high pressure air to a predetermined air pressure value or level, such as, for example, 2-8 psi depending upon the size of the airbag bladder and its surrounding container structure. When so disposed in its inflated condition, any voids otherwise existing between the load rolls are automatically filled or effectively eliminated, and in addition, the load rolls are effectively stabilized and readied for transportation of the same under conditions which will prevent substantial movement thereof and consequent damage thereto.

While such conventional bladder airbag systems have of course functioned well or properly from a purely operational viewpoint, it has been previously realized that such structural systems do present other problems from, for example, an economic transportational point of view. For example, since such conventional systems require the use of such specially contoured roll buffers and additional dunnage, the latter structures add significant amounts of weight to the overall weight of the cargo actually being transported, however, such additional weight does not constitute actual cargo for which transportation customers will pay shipping charges. Considered from a converse standpoint, the buffers and dunnage constitute cargo load or weight, and require additional cargo load space, which could otherwise be used in connection with actual transportation customer cargo loads.

In view of the foregoing, the aforenoted prior related patent application was directed toward the disclosure of a dual bladder airbag whereby the aforenoted deficiencies of the conventional or prior art type of bladder airbag system would be overcome and rectified, such as, for example, the additional specially contoured chocks or load roll buffers, along with the attendant dunnage, would be able to be eliminated. Briefly, in accordance with the invention disclosed within the prior related patent application, a pair of overlapping, inflatable bladders are incorporated within a relatively non-elastic container, and when the bladders are inflated, the overall external configuration of the bladders-container structure includes oppositely disposed concave surface portions which engage external peripheral portions of the cargo load rolls or drums whereby the bladders-container structure will not only fill the voids existing between adjacent cargo load rolls or drums, but in addition, such structure, by itself, that is, without the need for any additional chocks, buffers, and dunnage, cooperates with the cargo load rolls or drums so as to not only stabilize the cargo load rolls or drums, but such intercooperative cargo structures serve to effectively retain the bladders-container structure between the cargo load rolls or drums without movement of the bladders-container structure with respect to the cargo load rolls or drums or without the bladders-container structure undergoing undesirable disengagement from its position between the cargo load rolls or drums. Consequently, it has been found that the dual bladder airbag system of the prior related patent application has been quite successful in overcoming and rectifying the deficiencies attendant the known prior art bladder airbag system.

As has been also noted within the prior related patent application, with a dual bladder airbag system, when the overlapping bladders are inflated for usage, the overlapping portions of the bladders could directly engage each other and may therefore possibly tend to develop some friction therebetween which could possibly adversely affect the structural integrity of the bladders, at least within those portions of the bladders which may possibly frictionally engage each other. Accordingly, in accordance with a further feature of the invention, a slip sheet is interposed between the two inflatable bladders in order to minimize the amount of friction which may possibly develop between the bladders, and to in fact prevent direct engagement or contact between the bladders. As is also disclosed within the noted prior related patent application, however, the slip sheet is not always used in connection with the bladders, or alternatively, is only used depending upon, for example, the size of the particular cargo load rolls or drums. In addition, the slip sheet is not actually attached or secured to the bladders but only loosely interposed therebetween so as to be disposed in a free-floating mode within the airbag container, although its movement may be somewhat limited or restricted as a result of one of the inflation valves of one of the dual bladders passing through a portion of the slip sheet. Consequently, the slip sheet may experience or undergo some unintentional and undesirable movement with respect to the dual bladders whereby the slip sheet may not always be disposed with respect to the dual bladders in order to properly protect the bladders or effectively prevent the direct engagement or contact of the bladders whereby undesirable friction may in fact develop between portions of the bladders.

There is therefore a need, to which the present invention is directed, for a dual bladder airbag system which is not only able to achieve the objectives of the dual bladder airbag system disclosed within the prior related patent application, whereby the problems, drawbacks, and disadvantages of the known prior art are able to be overcome, but in addition, the new and improved dual bladder airbag system comprising the present invention may insure proper protection of the dual bladders of such airbag system at all times so as to assuredly eliminate or prevent the development of any friction, abrasion, or pinching of the bladders during inflation and operation of the same.

OBJECTS OF THE INVENTION

Accordingly, it is an object of the present invention to provide a new and improved dual bladder airbag system.

Another object of the present invention is to provide a new and improved dual bladder airbag system which is especially useful in connection with the bracing of cargo loads being transported upon a cargo transport vehicle.

Still another object of the present invention is to provide a new and improved dual bladder airbag system which overcomes the drawbacks, disadvantages, and problems encountered with prior art airbag systems used for cargo stabilization.

Yet another object of the present invention is to provide a new and improved dual bladder airbag system which effectively eliminates the need for the use of conventional chocks, buffers, and dunnage devices in conjunction with the airbags in order to effectively stabilize and brace the cargo loads.

A further object of the present invention is to provide a new and improved dual bladder airbag system which is able to effectively eliminate or prevent any direct contact or engagement between the dual bladders such that, in turn, friction, abrasion, or pinching of the bladders does not occur whereby the structural integrity of the bladders is effectively preserved.

SUMMARY OF THE INVENTION

The foregoing and other objectives are achieved in accordance with the present invention through the provision of a new and improved dual bladder airbag system which is especially useful for buffering and stabilizing cargo loads, such as, for example, large paper rolls or drums, which are disposed within a cargo bay for transporation of the same by means of a cargo transport vehicle. More particularly, the airbag system of the present invention is seen to comprise a pair of overlapping, inflatable bladders which are surrounded by means of a multi-ply paper container. When the bladders are inflated, they achieve or define an external configuration which includes oppositely disposed concave regions within which the cargo load rolls or drums are disposed. In this manner, the cargo load rolls or drums are effectively stabilized as a result of the airbag structure engaging the same by expanding within and completely filling the spaces or voids normally defined between the cargo load rolls or drums, and in addition, the cargo load rolls or drums, and the airbag structure, cooperate with each other so as to retain the airbag structure system at its position interposed between adjacent cargo load rolls or drums.

In accordance with the particular improvement of the present invention, and in order to better prevent the development of any friction, abrasion, or pinching between the dual inflatable bladders of the airbag system as a result of any direct contact or engagement between the dual inflatable bladders of the airbag system, and thereby better preserve the structural integrity and service life of the airbag structure or system, particularly the inflatable bladders thereof, whereby the bladders will not inordinately deteriorate, become weakened, or adversely inhibit the performance of the airbag structure or system, the slip sheet component of the airbag structural system as disclosed within the parent patent application is effectively replaced by means of a pair of bladder encasements comprising flexible sleeve members disposed about the inflatable bladders, respectively. The sleeves have longitudinal extents which are substantially equal to those of the bladders so as to entirely encompass the same, the opposite end portions of the sleeves, however, being open. Each sleeve will be fabricated from a suitable material similar to that utilized to fabricate the inflatable bladders, such as, for example, polyethylene, and each sleeve will be provided with an aperture located at a suitable location so as to permit the valve stem of the air inlet valve, operatively associated with each respective inflatable bladder, to pass therethrough. In addition, suitable adhesive means are also provided in connection with a suitable external portion of each sleeve so as to secure the sleeve, and therefore, in turn, each respective bladder, at a predetermined location within the outer multi-ply paper container. In this manner, the inflatable bladders are effectively prevented from directly contacting or engaging each other, all contact or engagement that may be developed between the bladder structures being defined between the abutting external sleeve members encasing the inflatable bladders, and consequently, any adverse effects of friction, abrasion, pinching, or the like, that may develop as a result of such contact or engagement between the sleeve members is not conducted or transmitted to the inflatable bladders. Consequently, the inflatable bladders do not suffer any inordinate deterioration or break-down in their structural integrity.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 1 is a simplified, perspective view of an airbag structure system constructed in accordance with the invention disclosed within the aforenoted prior related patent application, wherein an overwrap or outer container is shown partially broken away in order to illustrate the two deflated bladders of the airbag structure contained therein;

FIG. 2 is a simplified, partial, cross-sectional view, of the deflated airbag structure system constructed in accordance with the invention disclosed within the aforenoted prior related patent application and as illustrated within FIG. 1, illustrating the overlapping bladders within the outer container which is formed from paper or other suitable sheet material;

FIG. 3 is a simplified, partial, cross-sectional view similar to that of FIG. 2, showing, however, the airbag structure system of the invention disclosed within the prior related patent application when in its inflated state;

FIG. 4 is a simplified, schematic view of the inflated airbag structure system of FIG. 3 as employed in connection with, and interposed between, two cargo loads;

FIG. 5 is a simplified, partial, cross-sectional view of an inflated airbag structure system constructed in accordance with the PRIOR ART and as employed in connection with, and interposed between, two cargo loads;

DETAILED DESCRIPTION OF THE ILLUSTRATED EMBODIMENTS

Figure 6:
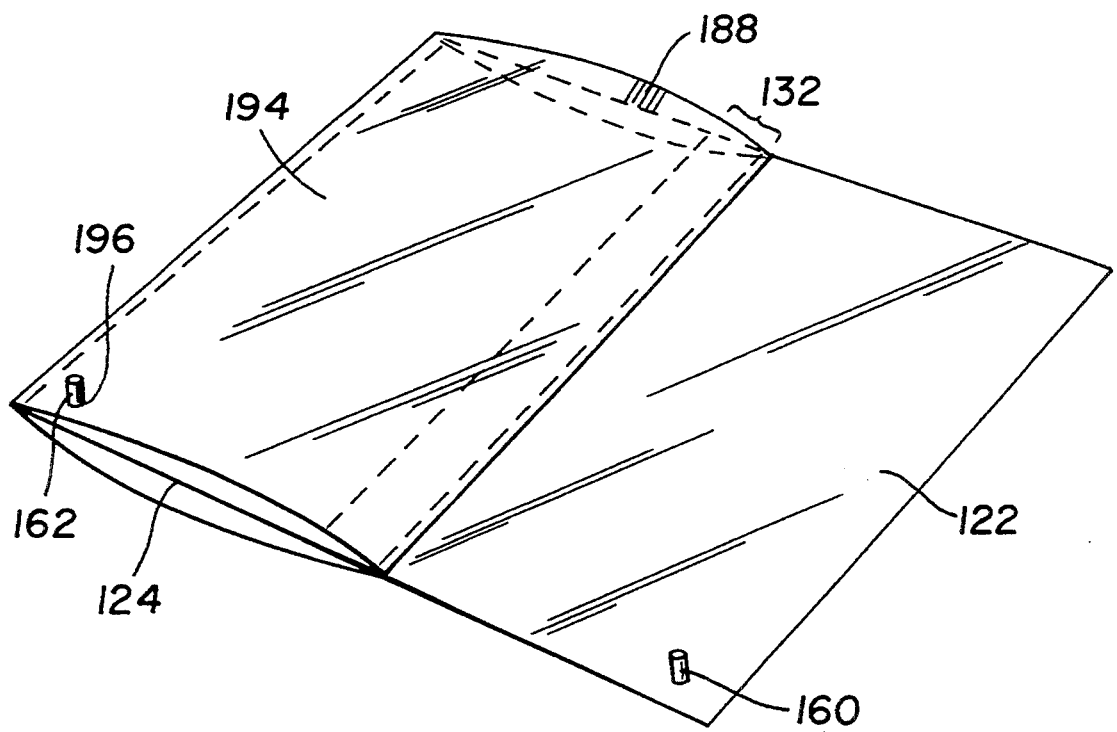
FIG. 6 is a simplified, partial, perspective view of the new and improved dual bladder airbag structure constructed in accordance with the present invention and illustrating the provision of the flexible, reinforcing, bladder sleeve as disposed about and encasing one of the inflatable bladders of the dual bladder airbag structure system of the present invention.

Referring initially to FIGS. 1–4, there is illustrated a dual bladder airbag structure system as previously disclosed within the aforenoted prior related patent application, and which is generally indicated by the reference character 20. The airbag system 20 is seen to comprise a pair of overlapping inflatable bladders 22 and 24 disposed within an encircling container 26. As particularly illustrated within FIG. 4, the airbag system 20 is especially well-suited for use as a means for engaging, holding, and stabilizing large objects having external cylindrical or other curved or irregularly contoured surface configurations, such as, for example, large paper rolls or drums 28 and 30 which are being transported within a suitable transport vehicle, such as, for example, a train, truck, ship, airplane, or the like. As can be appreciated from FIG. 4, the airbag system 20 is disposed within and fills the space or void left or defined between the cargo loads or rolls 28 and 30 when the rolls 28 and 30 are disposed in a side-by-side arrangement at their transport locations.

Each one of the inflatable bladders 22 and 24 may comprise a seamless tube of polyethylene, rubber, or the like, and is sealed so as to be air-tight. The bladders 22 and 24 may be fabricated so as to have different sizes in order to be useful in connection with the accommodation of different sized cargo loads or rolls 28 and 30, but it is also preferable that bladders 22 and 24 be of the same size when used together in pairs so as to properly support or stabilize a particular load.

As can be appreciated from the referenced FIGURES, the bladders 22 and 24 are disposed in an overlapping relationship both when the bladders 22 and 24 are in their deflated mode as illustrated in FIGS. 1 and 2, and in their inflated mode as illustrated in FIGS. 3 and 4. The overlapping region defined between the bladders 22 and 24 occurs along a centerline 34 of the airbag structure system 20, and the degree of overlap, as illustrated at 32 in FIG. 1, is dependent upon the size of the cargo loads 28 and 30 being supported or stabilized. For example, if polyethylene bladders, having a thickness of, for example, 4–6 mils, are used, the bladders 22 and 24 should overlap each other within a region which is approximately 2–4 inches wide when the bladders 22 and 24 are disposed in their deflated state. Then, when the airbag system 20 is interposed between the two cargo load rolls 28 and 30, or between a cargo load roll and a wall structure, not shown, and is subsequently inflated so as to achieve the disposition illustrated within FIG. 4, the bladders 22 and 24 will still overlap each other so as to result in the desired or intended support or stabilization of the cargo load rolls 28 and 30. The overlapping relationship defined between the bladders 22 and 24 also serves to properly distribute the load forces of the cargo load rolls 28 and 30 and prevents the bladders 22 and 24 from being completely collapsed and pinched together at their overlapping end portions 23 and 25. In addition, the noted relative overlapping of the bladders 22 and 24 serves to define a substantially concavely contoured external surface configuration upon the airbag structure 20 which, as will become more fully appreciated hereinafter, facilitates the stable support and bracing of the cargo load rolls 28 and 30 when the bladders 22 and 24 are inflated.

More particularly, as illustrated in FIG. 4, the overall or general external surface configuration of the airbag structure 20 will be modified or contoured so as to match or accommodate the external surface configurations of the cargo load rolls 28 and 30 when the bladders 22 and 24 are inflated and the airbag structure 20 achieves the structural interrelationship or mode, as defined between the bladders 22,24 and the container 26, as illustrated in FIG. 3. In view of the fact that the transverse dimension or lateral width of the external container 26, which is relatively non-elastic, is less than twice the corresponding dimension or width of each one of the bladders 22 and 24, the bladders 22 and 24 will be retained in their overlapping relationship with respect to each other even when the bladders 22 and 24 are inflated as disclosed within FIGS. 3 and 4. When the bladders 22 and 24 are inflated, and the substantially non-elastic container 26 is correspondingly expanded from its mode disclosed within FIG. 2 to that disclosed within FIG. 3, it is seen that the overlapping portions 23 and 25 of the bladders 22 and 24, which are disposed within the central region of the airbag structure 20 as denoted by centerline 34, have a height dimension which is less than the corresponding height dimension than the laterally outward portions 27 and 29 of the bladders 22 and 24 which are disposed adjacent to opposite end portions 36 and 38 of the airbag structure 20. In view of the foregoing structural interrelationships defined between the bladders 22 and 24, and the enveloping container 26, it is appreciated that when the bladders 22 and 24 are inflated, and the entire airbag structure 20 is interposed between cargo loads, such as, for example, the paper rolls or drums 28 and 30 as illustrated within FIG. 4, a central portion of each one of the opposite transverse sides 40 and 42 of the airbag structure 20 is caused to be pressed inwardly with respect to the airbag structure 20 such that each one of the side portions 40 and 42 comprises a relatively concave configuration which conforms to or accommodates the external configuration of each one of the cargo load rolls 28 and 30. Thus, not only does such positional interrelationship defined between the cargo rolls 28,30 and the airbag structure 20 comprising the inflatable bladders 22 and 24 serve to confine the airbag structure 20 between the cargo rolls 28 and 30 so as to prevent the inadvertent or unintentional escape of the airbag structure 20 out from between the cargo load rolls 28 and 30, or from between a cargo load roll and a wall structure, not shown, but in addition, and conversely, the airbag structure 20, interposed between the cargo load rolls 28 and 30 serves to properly support or stabilize the cargo load rolls 28 and 30 without requiring the use of additional dunnage 48 and 58, or specially contoured roll buffers 44 and 46 as was conventionally required when a conventional, single airbag 52 was previously used in connection with cargo load rolls or drums 54 and 56 as illustrated within FIG. 5. As a result of the use of the airbag structure 20, the extra weight and materials for the additional conventional dunnage and buffer devices is eliminated, as is the additional cargo space required to accommodate such added dunnage and buffer devices. Consequently, additional cargo space and gross weight allowance is now available for accommodating additional cargo loads, for example, additional cargo load rolls similar to rolls or drums 28 and 30.

The container 26 which is used to enclose or encase the inflatable bladders 22 and 24 is of known construction, and may comprise, for example, the multi-ply dunnage bag disclosed within U.S. Pat. No. 4,136,788 whose disclosure is accordingly incorporated herein by reference. More particularly, the container 26 comprises multiple layers of a suitable sheet material, such as, for example, 4-8 plies of paper, and completely encloses the inflatable bladders 22 and 24 therewithin. The size of the container 26 may of course vary and will depend upon the sizes of the bladders 22 and 24 being used for or in connection with a particular cargo load. The container 26 serves the additional purpose of protecting or shielding the inflatable bladders 22 and 24 from being punctured, for example, by surface portions of the cargo loads or by other random objects that may be present within the cargo bay.

As can be additionally seen from FIGS. 1-3, each one of the inflatable bladders 22 and 24 is provided with an inflation valve 60 and 62 for permitting inflation of the respective bladder 22 and 24. It is of course to be understood that a single valve could be used so as to simultaneously inflate both bladders 22 and 24. As illustrated, the valves 60 and 62 are located adjacent a peripheral portion 61 of the container 26 and extend through holes 64 and 66, respectively, defined within the container 26 so as to allow the bladders 22 and 24 to be inflated from a position external to the airbag structure 20 by means of, for example, pressurized air supplied by a suitable source, not shown. The bladders 22 and 24 are inflated to a suitable air pressure value, such as, for example, between 2-8 psi, depending upon the size, and the container structure, of the airbag 20.

In addition to the relative disposition of the inflatable bladders 22 and 24 with respect to the container 26 as defined by means of the valves 60 and 62 of the bladders 22 and 24 passing through the apertures 64 and 66 of the container 26, adhesive patches or tabs 68 and 70 are also provided upon corresponding portions of the bladders 22 and 24 so as to insure adherence of the bladders 22 and 24 to predetermined regions of the interior wall surface 58 of the container 26 during the inflation mode of the bladders whereby proper inflation of the bladders 22 and 24 is likewise insured. The adhesive patches 68 and 70 are preferably constructed so as to comprise either pressure-sensitive or hot melt adhesives, and the patches 68 and 70 are seen to be located adjacent to a peripheral portion 69 of container 26 which is disposed opposite peripheral portion 61 of container 26. In this manner, each inflatable bladder 22 and 24 is initially supported within container 26 at two substantially diametrically opposite locations as defined by means of the inflation valves 60,62 and the adhesive patches 68,70. Consequently, should the airbag structure 20 be oriented in such a manner that the peripheral region 69 is disposed at a higher elevation than that of the peripheral region 61, the adhesive patches 68,70 prevent the bladders 22 and 24 from sagging, sliding, or otherwise moving within the container 26, when the bladders 22 and 24 are disposed in their deflated state, so as to, in turn, prevent or inhibit incomplete or improper inflation of the bladders 22 and 24 when the same are desired to be inflated, whereby, otherwise, the bladders 22 and 24 would experience pinching and incomplete or non-uniform inflation such that the resulting airbag structure could not be used to properly support the cargo loads. The patches 68 and 70 therefore facilitate proper movement and inflation of all portions of the bladders 22 and 24 during the inflation mode. When the bladders 22 and 24 are fully inflated, the adhesive patches 68 and 70 will be released from the interior surface portion 58 of the container 26 and the bladders 22 and 24 will no longer be attached to the container 26. It is to be noted further that while the bladders 22 and 24 are illustrated in their inflated state in FIG. 3, and are illustrated further as being substantially separated from the interior wall surface 58 of the enveloping container 26, such is illustrated for purposes of clarity only, that is, it is to be understood that when the inflatable bladders 22 and 24 are inflated, substantially all of the surface regions of the bladders 22 and 24 will be disposed in surface contact with the interior wall surface 58 of the outer container 26.

In order to minimize the amount of friction that could possibly be developed between the bladders 22 and 24 when they are inflated or when the airbag structure 20 is in use, a slip sheet 72 may be interposed between the bladders 22 and 24 as shown in FIG. 3. The slip sheet 72 eliminates the direct contact or engagement of the bladders 22 and 24 thereby eliminating any abrasion or pinching of the bladders 22 and 24. The slip sheet 72 is not actually attached to the bladders 22 and 24, or to the enveloping container 26, and is therefore,, in effect, free-floating within the airbag structure 20. The slip sheet 72 may comprise multiple layers of paper, that is, for example, 1–3 plies of paper. The size of the slip sheet 72 may also vary depending upon the size of the bladders 22 and 24 being employed within the particular airbag structure 20. In addition, the slip sheet 72 may be provided with a suitable aperture or hole 74 so as to permit the inflation valve 60 of the bladder 22 to pass therethrough and thereby still be accessible from a position external of the airbag structure 20 as previously noted hereinabove.

In connection with the manufacture of the airbag structure 20, the bladders 22 and 24 are initially disposed in their deflated condition whereby the flattened bladders 22 and 24 are able to be disposed in their overlapping relationship as disclosed within FIG. 2. If the slip sheet 72 is to be used within the particular airbag structure, it is interposed between the bladders 22 and 24, and the adhesive patches or tabs 68 and 70 are placed upon the bladders 22 and 24. The bladders 22 and 24, and the slip sheet 72, if used, are then completely enclosed within the outer container 26 by conventionally known methods, whereby the adhesive patches 68 and 70 bond with or adhere to the interior wall surface 58 of the container 26 while the inflation valves 60 and 62 protrude outwardly through the container 26 so as to be accessible from a position external of the airbag structure 20.

When the airbag structure 20 is to be used in connection with cargo loads so as to buffer and stabilize the same, such as, for example, two paper rolls 28 and 30, the airbag structure 20 is placed within the space or void defined between the two cargo rolls or drums 28 and 30 while the airbag structure is still in its deflated condition. A worker then inflates the bladders 22 and 24 by injecting pressurized air thereinto from a suitable source of pressurized air, not shown, through means of the inflation valves 60 and 62 until the bladders 22 and 24 are inflated to a predetermined pressure value. In accordance with inflation techniques, the bladders 22 and 24 may be inflated separately and sequentially, or alternatively, the bladders 22 and 24 may be inflated simultaneously. When the bladders 22 and 24 are fully and properly inflated, the adhesive patches or tabs 68 and 70 will be released from their bonded state with respect to the outer container 26, and as a result of the inflation of the bladders 22 and 24, the airbag structure 20 will have an external configuration which conforms to the external configurations of the cargo rolls or drums 28 and 30 whereby the airbag structure 20 will be retained within the space or void defined between the cargo rolls or drums 28 and 30, and similarly, as a result of the retention of the airbag structure 20 within the void or space defined between the cargo rolls or drums 28 and 30, the airbag structure 20 serves to properly buffer and stabilize the cargo load rolls 28 and 30. After usage of the airbag structure 20, the same may be disposed of if for some reason it is considered to be unusable for subsequent cargo load buffering and stabilizing operations, or if capable of being reused, the bladders 22 and 24 may be deflated by appropriate means whereby the airbag structure 20 will be readied for subsequent usage.

As has been noted hereinabove, while the airbag structure 20 has been successfully commercialized, it is desirable to prevent the potential generation of friction which may possibly develop between the inflatable bladders 22 and 24 as they are inflated or while they are in use. The development or generation of such friction or abrasion between the bladders could possibly adversely affect the structural integrity of the bladders whereby they would no longer be useful for their intended purposes, or still further, the airbag structures employing such bladders would become dangerous in view of their pressurized conditions. In view of the foregoing, as noted hereinabove in accordance with the invention more particularly disclosed within FIG. 3, the airbag structure 20 has had incorporated therein the slip sheet 72 in order to prevent the direct contact between the bladders 22 and 24 whereby the development of friction or abrasion between the bladders 22 and 24, as a result of the bladders 22 and 24 rubbing or moving against each other, is effectively prevented. However, as has also been noted hereinabove, the slip sheet 72 is not always used within all airbag structures 20, that is, it is only used within airbag structures 20 of a particular size to be used in connection with particular cargo loads. Still further, in view of the fact that the slip sheet 72 is disposed in a substantially free-floating state within the airbag structure 20, it may undergo some unwanted movement with respect to the bladders 22 and 24 whereby the slip sheet 72 would no longer fully protect the bladders 22 and 24 against engagement between each other whereupon undesirable friction or abrasion may possibly result. Consequently, a need exists for an improved airbag structure wherein the inflatable bladders are always protected with respect to engagement or contact with each other whereby the potential development of friction, abrasion, or pinching of the bladders is assuredly prevented so as to, in turn, insure the structural integrity of the bladders and the airbag structure.

Figure 7:
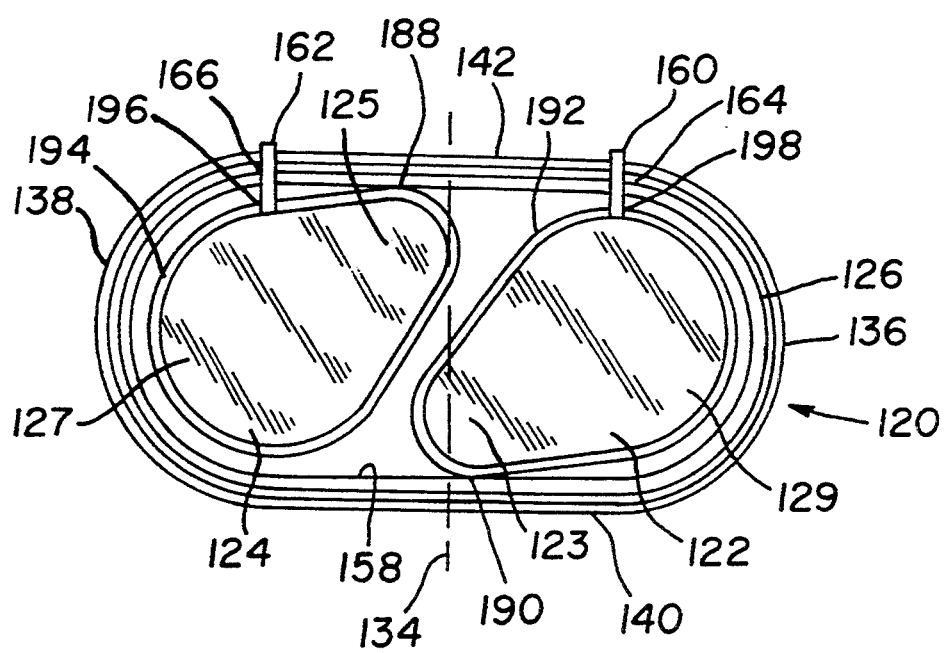
FIG. 7 is a simplified, partial, cross-sectional view similar to that of FIG. 3, showing, however, the airbag structure system of the present invention when in its inflated state and including the flexible, reinforcing, bladder sleeves disposed about both of the overlapping inflatable bladders of the dual bladder airbag structure system of the present invention.

Referring then to FIGS. 6 and 7, there is disclosed a new and improved dual bladder airbag structure generally indicated by the reference character 120, and including the new and improved bladder structures per se incorporated within the airbag structure system 120. It is to be noted that the airbag structure system 120 is in most respects similar to or identical with the airbag structure system 20 of FIGS. 1–4, and consequently, like or corresponding parts have been given the same reference characters with the notation that the reference characters are now part of a 100 series. Consequently, and briefly, the airbag structure system 120 comprises the dual inflatable bladders 122 and 124 which are disposed in an overlapping relationship within a central region having a predetermined width dimension 132 and a centerline location 134. The bladders are disposed within an outer container 126, and the bladders 122 and 124 are respectively provided with inflation valves 160 and 162 which project outwardly through apertures 164 and 166 provided within suitable regions of the outer container 126 so as to permit the bladders 122 and 124 to be inflated by means of pressurized air conducted thereinto through means of the valves 160 and 162, with the pressurized air being supplied by means of a suitable external source of pressurized air, not shown.

In accordance with the particular embodiment of the dual bladder airbag structure system 120 comprising the present invention, the slip sheet 72 of the embodiment of FIG. 3 has been eliminated and in lieu thereof, each inflatable bladder 122 and 124 is respectively encased within a flexible sleeve 192 and 194. Each sleeve may be fabricated from a material similar to that comprising the inflatable bladders 122 and 124, such as, for example, polyethylene, and it is seen from FIG. 6 that each sleeve, although only sleeve 194 is illustrated as covering or encasing the bladder 124, has a longitudinal extent or length dimension which corresponds to that of the bladder 122 or 124 it is encasing or enveloping, the oppositely disposed longitudinal ends of each sleeve being open. The sleeves 194 and 192 are also respectively provided with apertures or holes 196 and 198 for permitting the inflation valves 162 and 160 to pass therethrough as well as to pass through the apertures 166 and 164 of the outer container 126 as has been noted hereinabove. As a result of the disposition of the sleeves 192 and 194 about the respective inflatable bladders 122 and 124, direct contact between the bladders 122 and 124 is effectively prevented whereby friction, abrasion, and pinching of the bladders 122 and 124, during inflation of the bladders 122 and 124, as well as during subsequent usage of the airbag structure 120 when the bladders 122 and 124 are in their inflated state, is likewise effectively eliminated or prevented whereby adverse effects upon the bladders 122 and 124, which may lead to the deterioration of the same from a structural integrity point of view, is also prevented or reduced.

In order to affix each one of the sleeves 192 and 194 to the interior wall surface 158 of the outer container 126, in a manner similar to the fixation of the bladders 22 and 24 to the interior wall surface 58 of the outer container 26 of the embodiment of FIG. 3, adhesive patches, tabs, or the like, 188 and 190 are respectively provided upon exterior portions of the sleeves 194 and 192 at locations similar to the locations of the adhesive patches or tabs 68 and 70 disposed directly upon the bladders 22 and 24 as seen in the embodiment of FIG. 3. The adhesive means comprising the patches, tabs, or the like, 188 and 190 may, in particular, comprise double-sided adhesive tape or a suitable adhesive, such as, for example, a resin based (latex) cold glue, a rubber based cold glue, or a low-temperature, resin based hot melt adhesive. All of these adhesive products may be readily obtained from various vendors, such as, for example, BIRDSONG ADHESIVES, Nashville, Tenn., or IMPERIAL ADHESIVES, Cincinnati, Ohio. As was the case with the adhesive patches or tabs 68 and 70 of the embodiment of FIG. 3, the adhesive patches, strips, or the like, 188 and 190 serve to maintain the sleeves 194 and 192, and therefore the bladders 124 and 122, at predetermined zone locations and with predetermined orientations such that the bladders 124 and 122 can in fact be properly inflated during their inflation state or process whereupon achieving full and complete inflation, the entire airbag structure system 120 will function properly as desired and intended.

It is therefore seen that in accordance with the present invention as disclosed within FIGS. 6 and 7, FIG. 6 illustrating both inflatable bladders 122 and 124 when disposed in their deflated state, while FIG. 7 illustrates the entire airbag structure system 120 readied for use in cargo load support or stabilization operations as a result of the complete inflation of the inflatable bladders 122 and 124, that an airbag structure system 120 has been developed which not only overcomes the various drawbacks, disadvantages, and operational problems encountered with prior art cargo airbag stabilization or support systems, but in addition, improves upon the dual bladder airbag system 20 disclosed within the parent patent application in that potential friction, abrasion, and pinching of the airbag bladders has been able to be prevented or eliminated thereby providing the bladders with improved structural integrity and an increased service life. In particular, any potential friction, abrasion, or the like that may develop between the bladders will actually occur between the encasing sleeves whereby the noted adverse effects are not transmitted or conducted to the inflatable bladders.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A cargo airbag structural system, comprising:
   an expandable container comprising wall structure defining a single sealed enclosure;
   a plurality of separate and independent inflatable bladders disposed within said single sealed enclosure;
   a plurality of sleeves respectively disposed about said plurality of separate and independent inflatable bladders for preventing contact between said inflatable bladders as said inflatable bladders are inflated; and
   means fluidically connected to each one of said plurality of separate and independent inflatable bladders and projecting outwardly through said wall structure of said expandable container for permitting inflation of said plurality of separate and independent inflatable bladders.

2. A system as set forth in claim 1, wherein:
   said inflatable bladders overlap each other by a distance which is less than the width of one of said bladders.

3. A system as set forth in claim 1, wherein:
   said means fluidically connected to each one of said bladders comprises an air inlet valve; and
   said expandable container has a means defining an opening for allowing said air inlet valve to pass therethrough.

4. A system as set forth in claim 3, further comprising:
   means for attaching said sleeves to said expandable container so as to prevent said sleeves and said inflatable bladders from undergoing substantial movement with respect to said container regardless of the orientation of said airbag system when said bladders are disposed in a deflated state.

5. A system as set forth in claim 4, wherein:
   said attaching means comprises adhesive means fixedly securing said sleeves to interior wall portions of said expandable container.

6. A system as set forth in claim 5, wherein:
   each one of said sleeves is provided with an aperture for permitting said air inlet valve of said bladder disposed within said each one of said sleeves to pass therethrough; and
   said apertures of said sleeves are disposed at opposite ends of said sleeves with respect to said adhesive means of said sleeves.

7. A system as set forth in claim 1, wherein:
   said expandable container comprises a plurality of plies of paper.

8. A system as set forth in claim 1, wherein:
   each one of said bladders is fabricated from polyethylene.

9. A system as set forth in claim 1, wherein:
each one of said bladders is fabricated from rubber.

10. A system as set forth in claim 1, wherein:
said sleeves are fabricated from polyethylene.

11. A system as set forth in claim 1, wherein:
said sleeves comprise tubular members enveloping said bladders, said tubular sleeve members being open at opposite end portions thereof.

12. A cargo airbag structural system for placement between cargo loads within a cargo bay, comprising:
two separate and independent inflatable bladders;
said two separate and independent bladders overlapping each other by a distance which is less than one third of the width of one of said bladders;
each one of said two separate and independent bladders having gas inlet means operatively connected thereto for permitting inflation of said bladders;
a pair of sleeves respectively disposed about said two separate and independent inflatable bladders for preventing contact between said inflatable bladders as said inflatable bladders are inflated; and
an expandable container comprising a sealed wall structure for enclosing said two separate and independent bladders and said pair of sleeves disposed about said bladders, said expandable container including means defining an opening for allowing said gas inlet means to pass through said sealed wall structure of said expandable container for permitting inflation of said two separate and independent inflatable bladders.

13. A cargo system as set forth in claim 12, wherein:
said bladders overlap each other when said bladders are disposed in both inflated and deflated states.

14. A cargo system as set forth in claim 12, further comprising:
means for attaching said sleeves to said expandable container so as to prevent said sleeves and said inflatable bladders from undergoing substantial movement with respect to said container regardless of the orientation of said airbag system when said bladders are disposed in a deflated state.

15. A cargo system as set forth in claim 14, wherein:
said attaching means comprises adhesive means fixedly securing said sleeves to interior wall portions of said expandable container.

16. A cargo system as set forth in claim 15, wherein:
each one of said sleeves is provided with an aperture for permitting said gas inlet means of said bladder disposed within said each one of said sleeves to pass therethrough; and
said apertures of said sleeves, and said gas inlet means passing therethrough, are disposed at opposite ends of said sleeves with respect to said adhesive means of said sleeves.

17. A cargo system as set forth in claim 12, wherein:
said expandable container comprises a plurality of plies of paper.

18. A cargo system as set forth in claim 12, wherein:
each one of said bladders is fabricated from polyethylene.

19. A cargo system as set forth in claim 12, wherein:
each one of said bladders is fabricated from rubber.

20. A cargo system as set forth in claim 12, wherein:
each one of said sleeves is fabricated from polyethylene.

21. A cargo system as set forth in claim 12, wherein:
said sleeves comprise tubular members enveloping said bladders, said tubular sleeve members being open at opposite end portions thereof.

22. A cargo system as set forth in claim 12, wherein:
said expandable container has a predetermined width dimension extending along a lateral extent of said system; and
said bladders overlap each other at a substantially central portion of said width dimension of said expandable container as considered along said lateral extent of said system.

* * * * *